Nov. 3, 1953
D. G. MERRILL
2,657,788
WOVEN WIRE CONVEYER BELT
Filed Jan. 29, 1948
2 Sheets-Sheet 1
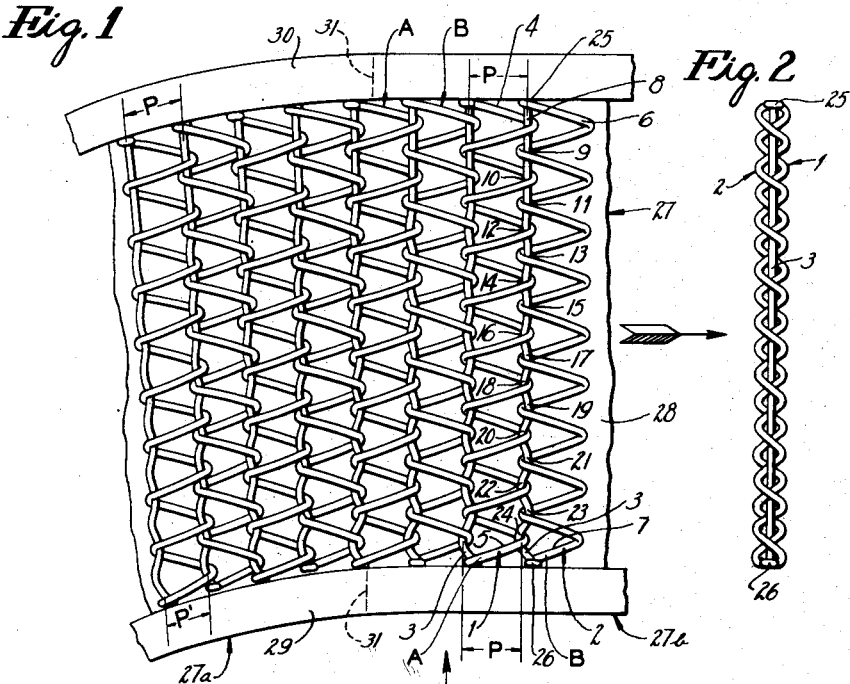
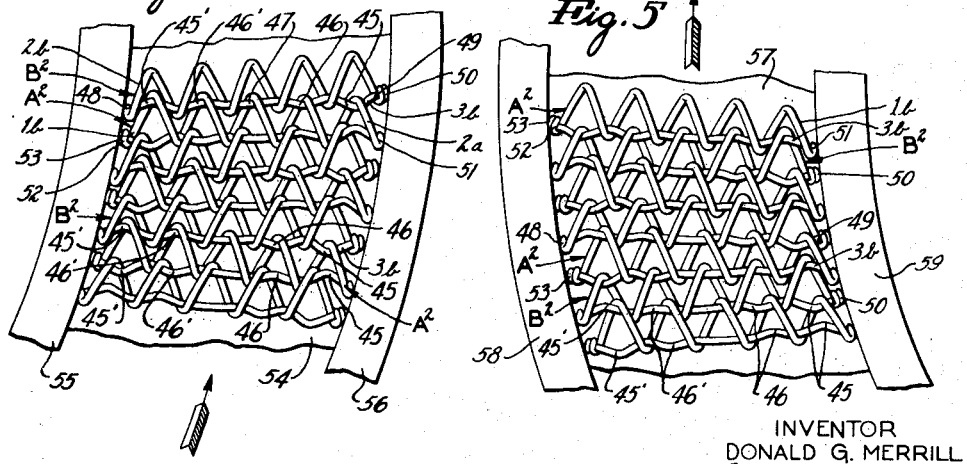
INVENTOR
DONALD G. MERRILL
BY Parham & Bates
ATTORNEYS Nov. 3, 1953 D. G. MERRILL 2,657,788
WOVEN WIRE CONVEYER BELT
Filed Jan. 29, 1948 2 Sheets-Sheet 2

INVENTOR
DONALD G. MERRILL
BY Parham & Bates
ATTORNEYS

Patented Nov. 3, 1953

2,657,788

UNITED STATES PATENT OFFICE 2,657,788

WOVEN WIRE CONVEYER BELT

Donald G. Merrill, West Hartford, Conn., assignor to Emhart Manufacturing Company, a corporation of Delaware Application January 29, 1948, Serial No. 5,145

7 Claims. (Cl. 198—193)

This invention relates to woven wire conveyors or conveyor belts of the type which is particularly adapted to support and carry articles of glassware although of course not limited to this use. Woven wire conveyor belts of this general type as heretofore constructed usually are adapted to carry the articles transported thereby horizontally along a straight path. In some instances, woven wire conveyors have been constructed to carry the supported articles along a horizontally curved path of constant radius. However, the woven wire conveyors adapted for straight line movement are not suitable for travel along a curved path nor are the woven wire conveyors which are adapted to move along a path of constant curvature suitable for travel in a straight line.

An object of the present invention is to provide a woven wire conveyor or conveyor belt of the general type above referred to which is adapted for guided movement along either a straight path or a curved path or a path having both straight and curved portions.

Another object of the invention is to provide a woven wire conveyor or conveyor belt of the character described which will provide a supporting surface on which articles such as bottles, jars, and the like may stand firmly during transportation thereof by the conveyor or conveyor belt, even though the articles thus transported are carried along a path that is straight or is curved or has both straight and curved portions.

Another object of the invention is to provide a woven wire conveyor or belt comprising component transversely disposed spirally turned wires and connecting transversely disposed hinge wires so formed and assembled as to provide distribution of tension stresses in the conveyor or belt under load such that each turn of spiral wire takes its share of load at all times, irrespective of whether or not the direction of travel is along a straight path or a laterally curved path.

Other objects and advantages of the invention hereinafter will be pointed out or will become obvious from the following description of illustrative examples of woven wire conveyor structures embodying the invention, as shown in the accompanying drawings, in which:

Fig. 1 is a plan view of a portion of one form of woven wire conveyor or conveyor belt structure and of a fragmentary portion of its supporting guideway, this conveyor or conveyor belt structure being suitable to carry articles along a horizontal path that curves laterally at one or more places from a straight forward direction;

Fig. 2 is an end view of the woven wire conveyor or conveyor belt structure of Fig. 1 as viewed from the right end of that view;

Fig. 3 is a view like Fig. 1 but showing a second form of woven wire conveyor or conveyor belt structure which is adapted for travel along a horizontal path which may curve laterally in either of opposite directions from a straight forward direction, the view showing this second form of woven wire structure as it appears when moving along a straight path;

Fig. 4 is a view showing a narrower example of the second form of woven wire structure as it appears when moving along a path curving to the left as viewed in plan;

Fig. 5 is a view showing the same form of woven wire structure as it appears when moving along a path curving to the right.

Figure 6:
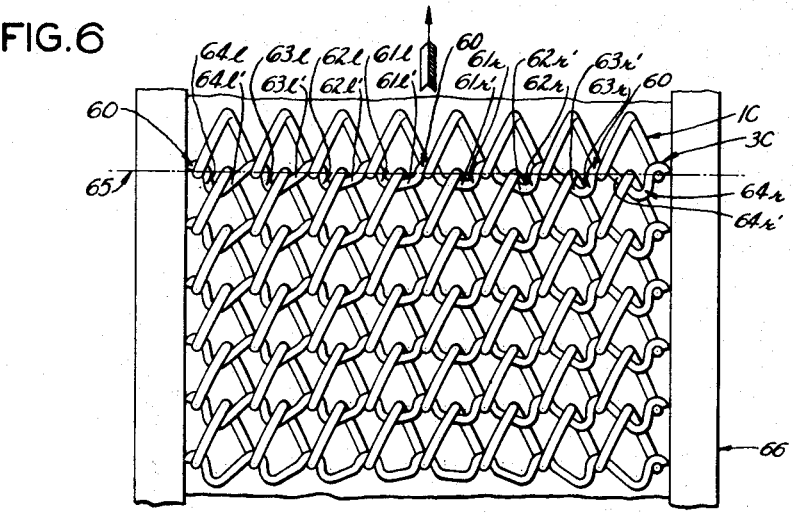
Figs. 6, 7 and 8 are views like Figs. 3, 4 and 5, respectively, but showing a third form of woven wire structure.

The woven wire structure of the present invention as embodied in the example shown in Figs. 1 and 2 comprises transversely disposed alternating right and left-hand, spirally turned wires, designated 1 and 2, respectively, hingedly connected and articulated into a continuous length of flexible woven wire structure by transversely disposed connecting wires 3. Each right-hand, spirally turned wire 1 is formed so that the spiral turns thereof decrease regularly in width from the end turn, designated 4, at one end thereof to the opposite end turn, designated 5, and so that the height of these turns of progressively varying width when the wire lies flatwise on a horizontal surface is uniform, as will be understood from the combined showings of Figs. 1 and 2 and as is known practice in the construction of woven wire conveyors or conveyor belts of the general type described. A right-hand, spirally turned unit of this description may be produced in any suitable known way, as by winding a straight wire spirally around a suitably flattened tapering mandrel. The left-hand, spirally turned wires 2 are similarly formed so that each has a turn, designated 6, of greatest width at the same end as the widest portion of the right-hand, spirally turned wire 1 and the other turns of the left-hand, spirally turned wire 2 decrease in width regularly to a narrowest turn, designated 7, at the opposite end of the wire 2.

The taper or regular and progressive variation in width of the turns of the right and left-hand, spirally turned component wires of the woven wire structure cooperates with the special form and arrangement of the connecting wires 3 to provide important advantages when these component wires are articulated into a continuous conveyor or conveyor belt structure. Each wire 3 may be formed of a straight wire having one end portion thereof, designated 8, left straight and the remainder of the wire then bent or crimped laterally back and forth to progressively increasing distances from the axis of the straight portion 8 so that it then consists of a series of laterally curved crimps or bent portions, designated 9, 10, 11, 12, 13, 14, 15, 16, 17, 18, 19, 20, 21, 22, 23 and 24, respectively, of progressively greater lateral extent or depth from the straight end portion 8 to the opposite end of the wire 3, the lateral crimp or bend 24 thus being the deepest.

The components of the woven wire structure just described are formed in relation to one another so that they may be assembled as shown in Fig. 1 to provide a structure adapted to travel along a straight path or along a path that curves to the right from a straight forward direction without any binding between the relatively movable components or buckling or warping vertically of any portion of the woven wire structure and without causing slackness of the inner edge or increased tension in the outer edge of the structure by reason of a change of direction thereon. In this structure, the spirally turned component wires 1 and 2 and the transversely disposed connecting or hinge wires 3 are relatively formed and arranged so that the straight end portion 8 of each connecting wire 3 and the wider turns 4 and 6 of the wires 1 and 2 connected thereby form the outer edge portion of the woven wire structure when the structure is moving along a path of right-hand curvature. In this structure, the widest turn, 4 or 6, of each trailing spiral wire 1 or 2 is looped around the straight portion 8 of the preceding connecting wire 3 and the outer end of the wider turn 6 or 4 of the immediately preceding wire, 2 or 1, is bent around and may be made fast, as by welding, to the extreme outer end of the straight portion 8 of that same connecting wire 3, as indicated at 25. The other turns of the two connected, respectively right and left spirally turned wires are looped around the interposed wire 3 so that the turns of the leading wire engage the forwardly turned bends or crimps and the turns of the trailing wire engage the rearwardly turned bends or crimps of that wire 3. The narrowest turn, 5 or 7, of the trailing wire 1 or 2 engages the deepest crimp 24 of the connecting wire 3 and the end of the narrowest turn, 7 or 5, of the leading, spirally turned wire is bent around and may be made fast, as by welding, to the end of that wire 3, as indicated at 26. The arrangement is such that the differences between the lateral extents or depths of the bends or crimps of a connecting wire 3 correspond to the differences in widths between the spiral turns of the wire in engagement therewith. Thus, the width of the narrowest loop of a spirally turned wire 1 or 2 at one end of such wire plus the lateral extent or depth of the deepest crimp or bend in the connecting wire 3 that is fast at its ends to that spirally turned wire is substantially the same as the width of the widest turn at the opposite end of the spirally turned wire, at which place the wire 3 is straight.

Each right-hand, spirally turned wire 1 and the connecting wire 3 which are fastened to each other at their ends in assembled relation as just described may be said to form one transversely disposed unit, which may be designated generally A, of the conveyor or conveyor belt structure. Each left-hand, spirally turned wire 2 and its connecting wire 3, which are similarly fastened together, constitute a second transversely disposed unit, which may be designated B. The units A and B alternate to form a woven wire conveyor or conveyor belt of a predetermined length or of an endless character, the loops of the spirally turned component of each unit A or B extending around portions of the connecting wire 3 of the immediately preceding unit B or A as hereinbefore described. The showing in Fig. 1 is, of course, of any portion of such a structure and may be a portion of the upper stretch of an endless conveyor belt, this being the stretch on which articles of glassware or other articles to be conveyed would be placed.

As shown in Fig. 1, the woven wire conveyor or conveyor belt structure is supported and guided by a guideway structure 27 comprising a flat base or supporting surface 28 on which the woven wire structure may slide and spaced guide rails 29 and 30, respectively, for the lateral edges of the woven wire conveyor structure. The guideway shown comprises a portion 27a of right-hand curvature extending from the left-hand end of Fig. 1 to approximately the transverse broken dash line 31 and a further straight portion 27b.

When the conveyor or conveyor belt structure shown in Fig. 1 is moved along the guideway 27 in the direction indicated by the direction arrow, the places at which the spiral turns of each unit A or B in the portion of conveyor structure in the straight portion 27b of the guideway engage the crimps or bends of the connecting wire 3 of the immediately preceding unit are approximately midway of the individual crimps or bends and this portion of the conveyor structure is being pulled and guided straight ahead in a perfectly flat position. The pitch is the same at both edges of this portion of the conveyor structure and is so indicated at P. The portion of the conveyor structure in the curved portion 27a of the guideway likewise is being pulled along the guideway in a flat position without any vertical buckling, warping or local displacement of any part thereof but along a path having a radius, the places of engagement of the spiral loops of each unit A or B of this portion of the conveyor structure with the connecting wire 3 of the preceding unit having been shifted laterally to the right from the deeper middle portions of the engaged rearwardly turned crimps or bends of this connecting wire. This lateral shifting of the spiral loops of each unit and a consequent skewing of the portion of the conveyor structure in the right-hand curve of the guideway results from a localized camming to the right of each unit by the contact of the outer guide rail 30 with the end 25 of that unit as it is moved from a preceding straight section (not shown but similar to 27b) of the guideway. Since the wider loops of the units engage straight portions 8 of the connecting wires 3 at all times, the pitch of the outer edge of the conveyor structure will be the same when moving along the curved portion 27a of the guideway as when moving along the straight portion 27b thereof and is so indicated at P. The pitch of the inner edge of the conveyor structure will have been shortened by the skewing of units of the conveyor structure to the right in passing into and around the right-hand curve as indicated at P'. In returning to a straight section of the guideway from a section of right-hand curvature as shown in Fig. 1, the side rails of the guideway will exert a sufficient camming action on the ends of the units to return the spiral loops of the individual units to the deeper middle portions of the crimps or bends of the connecting wires 3 of the preceding units. This will restore equality of pitch of both edges of the conveyor structure, the axes of the connecting hinge wires 3 of the units being in parallelism while the units are moving in a straight portion of the guideway.

It will be obvious that the construction and functional characteristics of the conveyor or conveyor belt structure as shown in Fig. 1 are such as to permit movement thereof along a guideway as described in the reverse direction to that indicated by the direction arrow in Fig. 1. Also, the structure shown will be adapted for travel in a section of guideway of left-hand curvature simply by turning it over so that the wider spiral turns and the straight end portions of the connecting hinge wires of the units will be at the outer side of a left-hand curve instead of at the outer side of a right-hand curve as shown.

The construction shown in Fig. 3 is adapted to turn from a straight direction either to the right or to the left. This form of construction makes use of right-hand, spirally turned wires, one of which is shown at 1a in Fig. 3, left-hand, spirally turned wires, two of which are shown at 2a in Fig. 3, and transverse connecting or hinge wires, designated 3a, one of which is provided for each of the spirally turned wires. The turns of each of the spirally turned wires 1a and 2a, which may be partially flattened in accordance with conventional practice as hereinbefore explained, are of uniform width throughout. Each connecting wire 3a is provided with oppositely turned lateral bends or crimps at opposite sides of the transverse median line of the wire and of increasing depth toward the ends of the wire, these crimps corresponding in number with and being spaced appropriately for engagement with spiral turns of the immediately following spirally turned wire of the conveyor structure when the components of such structure have been assembled as hereinafter will be explained. Thus, in the case of a structure comprising spirally turned wires having eight turns, as shown in Fig. 3, the wire 3a for hingedly connecting adjacent spirally turned wires of the structure is formed with relatively deep oppositely turned crimps or lateral bends 32 and 32' at the opposite ends thereof, with shallower oppositely turned crimps or bends 33 and 33' spaced inwardly from the outer crimps or bends, with still shallower oppositely turned crimps or bends 34 and 34' inwardly thereof and with still shallower oppositely turned bends or crimps 35 and 35' nearest to and equidistant from opposite sides of the transverse middle line of the wire.

In assembling these components in units A' and B', respectively, comprising a right-hand, spirally turned wire 1a and a connecting hinge wire 3a fastened together at their ends and a left-hand spirally turned wire 2a and a connecting hinge wire 3a fastened together at their ends, the connecting hinge wires 3a of alternate units are reversed end for end. Thus, the connecting hinge wire 3a of the unit B' at the top of Fig. 3 has its connecting hinge wire 3a disposed so that the forwardly turned crimps 32', 33', 34' and 35' are at the left of the longitudinal median line of the assembled structure while these same crimps or bends are at the right of the longitudinal median line of the structure in the succeeding and immediately following unit A'. The components are arranged in assembling the structure so that the spiral turns of each unit A' or B' pass around the crimps or lateral bends of the transversely disposed connecting hinge wire 3a of the immediately preceding unit. The ends of the spirally turned wire 2a and of the transversely disposed connecting hinge wire 3a of that unit are fastened together, at their extremity, as by welding and as indicated at 36 and 37, respectively. An integral or rigid end projection is provided at the right-hand end of this unit B' as indicated at 38 for a purpose to be presently explained. This projection 38 may be a twisted end extension of one of the wire components of the unit B' included in the weld at that end of the unit.

The components 1a and 3a of each unit A' are similarly fastened together at their ends as indicated at 39 and 40, respectively, and an integral end extension is provided at 41, similar to the end extension 38 of unit B', but at the left-hand end of unit A'.

In moving along a straight guideway having a flat base or supporting surface 52 and parallel side rails 43 and 44, as shown in Fig. 3, the woven wire structure will lie flat so as to provide a stable supporting surface for articles placed thereon. The component alternating units B' and A' of this structure will be skewed slightly from horizontal lines perpendicular to the direction of forward movement of the structure along a straight guideway. This is because the loops of each trailing unit engage with oppositely turned lateral crimps or bends of the transversely disposed hinge wire on the preceding unit at opposite sides of the middle point of such connecting hinge wire. The projections 38 and 41 will guide the conveyor structure in its movement along the straight guideway. This structure may be moved into and along a subsequent portion of the guideway, not shown, of either right or left-hand curvature as the camming action of the curved rails of such a guideway on the contact projections at ends of the units will cause lateral relative shifting and skewing thereof as required to permit the lateral turning of the conveyor structure while it remains flat, the loops of each trailing unit being shifted forwardly along one or the other of the legs of the rearwardly turned crimps or bends in the connecting hinge wire of the immediately preceding section and rearwardly to the same extent along one or the other of the legs of the forwardly turned crimps or bends of the same connecting hinge wire as such trailing unit moves from a straight path into a curved path.

Figs. 4 and 5 show a structure substantially like that just described except that the spirally turned components of this structure have only five turns instead of eight as in Fig. 3 and the transversely disposed connecting hinge wires are appropriately formed and of appropriate length for the narrower structure. In the structure shown in Figs. 4 and 5, the left-hand, spirally turned wires are designated 2b, the right-hand, spirally turned wires are designated 1b, the connecting or hinge wires are designated 3b and the alternating units formed of these components as previously described are designated $B^2$ and $A^2$. In this structure, each wire 3b has relatively deep oppositely turned lateral crimps or bends 45 and 45' at opposite ends of such wire, shallower opposite crimps or bends 46 and 46' spaced inwardly from the deeper crimps and an intermediate substantially straight portion, designated 47, extending between the oppositely turned crimps or bends 46 and 46'. In the assembled construction, the middle one of the five spiral turns of each trailing unit extends around this substantially straight middle portion 47 of the wire 3b of the immediately preceding unit while the turns to the right and to the left, respectively, of the middle turn extend around the crimps or bends of the opposite end portions of the same connecting hinge wire. Each unit $B^2$ has its components fastened together as described, as at 48 and 49, respectively, and is provided with an integral or rigid extension 50 at the right-hand end thereof. Each unit $A^2$ has its components fastened together at their ends as indicated at 51 and 52, respectively, and is provided with an integral or rigid end extension, designated 53 at the left-hand end thereof. The hinge wires 3b of each two adjacent units are fastened to the ends of the spirally turned wires of such units with their corresponding crimps or bends turned 180°, each in relation to the other. Thus, in Fig. 4, the hinge wire 3b of the leading unit $B^2$ has its crimps or bends 45' and 46' turned forward and its crimps 46 and 45 turned to the rear while the hinge wire 3b of the adjacent unit $A^2$ has its crimps or bends 45' and 46' turned to the rear and its crimps or bends 46 and 45 turned forward. In Fig. 4, a guideway having a left-hand curvature is shown and comprises a base or supporting surface 54 and curved guide rails 55 and 56, respectively. In moving along this curved guideway, the spiral loops of each unit $B^2$ have been shifted to the left relative to the hinge wires of the preceding $A^2$'s from the positions which they would occupy in moving along a straight guideway. Fig. 5 shows a guideway having a right-hand curvature and comprises a base 57 and curved rails 58 and 59, respectively. In moving along this guideway, the spiral loops of each unit $A^2$ of the conveyor structure have been shifted to the right relative to the hinge wires of the preceding $B^2$'s from the positions which they would occupy in moving along a straight guideway. In each instance, the units having projections 53 or 50 in guided contact with the inner rail on the curve have been shifted by such contact to the left or right according to the hand of the curvature.

While the transversely disposed spirally turned wires of each of the two specifically different forms of woven wire structure described so far preferably are alternately right and left-hand so as to obviate in a known manner undesirable lateral creeping of such a structure as it passes around the axis of a horizontal supporting roller or drum such as frequently is used for a woven wire belt, such wires may all be of the same hand. In the showing of the third form of woven wire structure, Figs. 6 to 8, inclusive, the transversely disposed spirally turned wires are all shown as left-hand spiral wires although these might be of the other hand or alternately right and left-hand.

Figure 7:
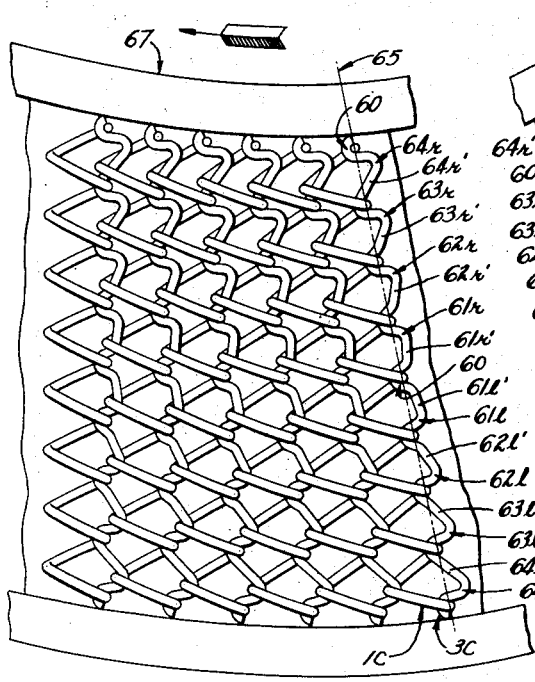
Figure 8:
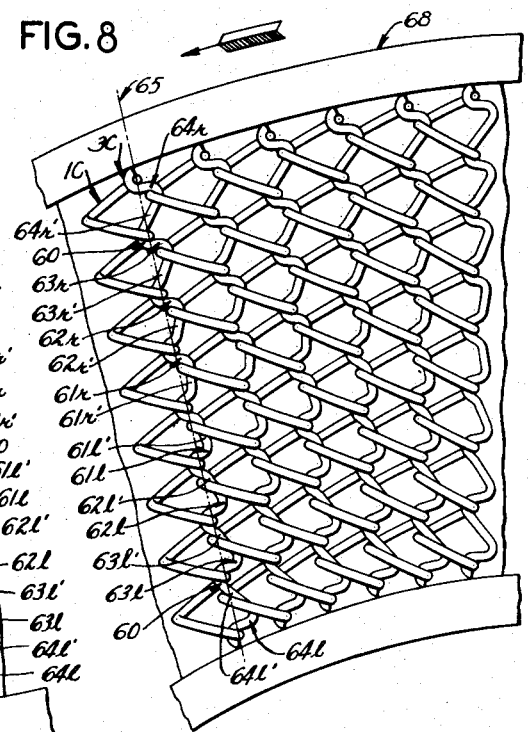

Referring now more particularly to Figs. 6 to 8, inclusive, the woven wire structure shown therein comprises transversely disposed spirally turned wires 1c and transversely disposed crimped hinge wires 3c, each threaded through the turns of two adjacent spirally turned wires and fastened at its ends to the ends of one of them, as to the ends of the leading one of such two wires as previously described and as shown. Each hinge wire 3c is of special form and has been crimped or bent to have similar, spaced lateral crimps or bends 60 at one side of its axis, these being appropriately spaced and of the required number to provide one such crimp or bend in engagement or bearing contact with each of the turns of the spirally turned wire 1c to the ends of which the ends of that particular hinge wire are fastened. At the opposite side of its axis, the hinge wire 3c has been formed with lateral crimps or bends of regularly increasing depth from the middle portion of the wire toward each of the opposite ends thereof, as indicated at 61–l, 62–l, 63–l and 64–l for the crimps or bends of the left-hand portion of the hinge wire and at 61–r, 62–r, 63–r and 64–r for the corresponding crimps or bends of the right-hand portion thereof. For convenience, the crimps or bends 60 are termed "leading crimps or bends" and the crimps or bends 61–l to 64–l, inclusive, and 61–r to 64–r, inclusive, are termed "trailing crimps or bends" as a woven wire structure as shown in Figs. 6 to 8, inclusive, normally would be moved in the direction indicated by the direction arrows although conceivably it might be moved in the opposite direction. The trailing crimps or bends are laid out so that each is angular in configuration when viewed in plan and includes an inner leg, i. e., the leg thereof nearest to the transverse median line of the hinge wire, around which a turn of the trailing spirally formed wire extends and against which such turn bears when the woven wire structure is being pulled or placed otherwise in tension. The inner legs of the several trailing crimps or bends are indicated by the same reference characters, primed, as have been used to designate these crimps or bends. The trailing crimps or bends are laid out so that the inner legs thereof, against which the turns of the trailing spirally turned wire bear, are substantially straight and extend from their inner ends outward in directions having rearward components varying in degree or value according to their distances from the transverse median line of the hinge wire and in relation to a base line extending transversely of the woven wire structure through the vertical axes or center lines of the leading crimps or bends as indicated at 65 for the hinge wire 3c nearest the upper end of Fig. 6, the inner legs of the trailing crimps or bends nearest the ends of the hinge wire and hence nearest the side edges of the woven wire structure having the greatest divergence from the base line. Thus, in the example shown, the inner legs 61–l' and 61–r' of the inner trailing crimps or bends 61–l and 61–r diverge rearwardly from the base line 65 only slightly and the inner legs of each succeeding pair of right and left-hand trailing crimps or bends diverge to an extent that has been increased over the preceding pair according to a predetermined arithmetical progression. The arrangement is such that the turns of the trailing one of each two spirally turned wires connected by a hinge wire 3c will bear against the inner legs of the trailing crimps or bends of that hinge wire continuously under all conditions of service for which a woven wire structure formed of such spirally turned wires and crimped hinge wires is intended. Thus, when the illustrative woven wire structure just described is being drawn along a straight guideway, generally designated 66, as indicated by Fig. 6, the turns of the trailing spirally turned wires of the structure will bear against the inner legs of the trailing crimps or bends of the preceding hinge wires at approximately their midpoints. When such a structure is being drawn along a guideway of right-hand curvature, designated 67, as indicated by Fig. 7, the points of bearing of the turns of trailing spirally turned wires with the trailing crimps or bends of the preceding hinge wires will all have been shifted to the left so that these points of bearing are now at the inner ends of the legs 61–r' to 64–r' of the right-hand trailing crimps or bends and at the outer ends of the legs 61–l' to 64–l', inclusive, of the left-hand trailing crimps or bends. This will be attended by a relative shortening of the inner or right-hand edge of the woven wire structure. When such woven wire structure is being drawn along a guideway of left-hand curvature, designated 68, as shown by Fig. 8, the points of bearing referred to will have been shifted to the right so as to be at the inner ends of the legs 61–l' to 64–l', inclusive, and at the outer ends of the 61–r' to 64–r' of the trailing crimps or bends of the hinge wires. In all three instances, each turn of spiral wire will take its share of the pull or load as the tensional stresses will be distributed to all components of the woven wire structure.

The particular lengths of the inner legs of the trailing crimps or bends and their angular relationships to their base line are suitable for a woven wire structure comprising spirally turned wires of the pitch and length and number of turns shown in Figs. 6 to 8, inclusive, and for a change from a straight forward movement of the structure to a movement curving either to the right or to the left to the extent shown. Such lengths and angular relationships may be different in woven wire structures of different weaves or widths or having different spirally turned component wires or intended for movement along paths of greater curvature and in each instance the trailing crimps or bends of the hinge wires should be laid out to be appropriate for the structure and service involved, the controlling consideration being the requirement that the turns of the trailing spirally turned wires may shift along such inner legs as required while always being in bearing contact therewith and under pull therefrom when the woven wire structure is being drawn along either a straight or curved path.

The illustrative structures shown in the drawings and herein particularly described may be modified and changed in ways which will now be obvious to those skilled in the art and I therefore do not wish to be limited to the details of these illustrative embodiments of the invention.

I claim:

1. A woven wire conveyor comprising a series of transversely disposed spirally turned wires and a transversely disposed hinge wire extending through the turns of and hingedly connecting each two adjacent such spirally turned wires, said hinge wire having opposite end portions rigidly secured to the opposite ends of the leading one of said two hingedly connected spirally turned wires at a line located rearwardly of the axis of said leading wire, the ends of said hinge wire being free from the ends of the other of said two hingedly connected wires, the turns of said spirally turned wires being uniform in width and said hinge wire being formed with rearwardly turned crimps or bends of increasing depth from the middle of the hinge wire to the opposite ends thereof arranged to engage correspondingly located turns of the trailing spirally turned wire.

2. A woven wire conveyor as defined by claim 1 and in addition thereto a rigid contact projection fixed to the secured together right-hand ends of each left-hand, spirally turned wire and its connected hinge wire and a similar projection on the secured together left-hand ends of each right-hand, spirally turned wire and its hinge wire.

3. A woven wire conveyor comprising a series of transversely disposed spirally formed wires and transversely disposed crimped hinge wires respectively extending through the turns of each two adjacent spirally formed wires to hinge them together, each hinge wire having spaced lateral crimps at one side thereof extending through and bearing against one of the two adjacent wires hinged together thereby and having spaced lateral crimps at the opposite side thereof extending through and bearing against the turns of the second of said two adjacent wires, there being a plurality of said second-named lateral crimps in the hinge wire at each side of its transverse median line and the depth thereof increasing so that the deepest of the second named lateral crimps are farthest from said transverse median line.

4. A woven wire conveyor comprising a series of transversely disposed spirally formed wires and transversely disposed crimped hinge wires respectively extending through the turns of each two adjacent spirally formed wires to hinge them together, each hinge wire having spaced lateral crimps at one side thereof extending through and bearing against one of the two adjacent wires hinged together thereby and having spaced lateral crimps at the opposite side thereof extending through and bearing against the turns of the second of said two adjacent wires, there being a plurality of said second named lateral crimps in the hinge wire at each side of its transverse median line, each of said second named lateral crimps being angular in configuration and having a substantially straight inner leg nearest to said transverse median line extending on a line oblique to a base line extending longitudinally of the hinge wire through the centers of said first named lateral crimps, the obliquity of the inner legs of the second named lateral crimps at opposite sides of said transverse median line being graduated to be relatively greater the farther from said transverse median line.

5. A woven wire conveyor comprising a series of transversely disposed spirally formed wires and transversely disposed crimped hinge wires respectively extending through the turns of each two adjacent spirally formed wires to hinge them together, each of said crimped hinge wires having spaced similar lateral crimps or bends at one side thereof extending through and bearing against the turns of one of the two spirally formed wires hinged together thereby, being connected at its ends to that same spirally formed wire, and having spaced lateral crimps or bends at its opposite side extending through and bearing against the turns of the second of the two adjacent spirally formed wires hinged together by that hinge wire, the second named lateral crimps or bends of the hinge wire being symmetrical at opposite sides of the transverse median line of the hinge wire and having the bearing portions thereof formed to be oblique to a base line extending through the centers of the first named lateral crimps or bends, the obliquity of the bearing portions of the second named lateral crimps or bends varying with the distance thereof from said transverse median line and being greater the farther therefrom.

6. A woven wire conveyor belt comprising a series of transversely disposed spirally formed wires and transversely disposed hinge wires, each hinge wire extending through and hingedly connecting the turns of two adjacent spirally formed wires, one of which is fixed at its ends to the ends of the hinge wire while the other spirally formed wire is free at its ends from the same hinge wire and is in free bearing contact therewith at its turns, the turns of the two adjacent spirally formed wires and the portions of the hinge wire extending therethrough being cooperatively shaped and associated to cause a pull on all turns of the relatively trailing one of the two hingedly connected wires when the belt is being pulled in a forward direction along a substantially horizontal supporting guideway and to permit limited relative axial shifting movements between these two hingedly connected wires when they pass from a straightaway portion to a laterally curved portion of the guideway and vice versa while all turns of the trailing wire are under pull from the leading one, the portions of the hinge wire extending through the turns of the free one of said two hingedly connected spirally formed wires being shaped to co-act with said turns on each relative axial shifting movement between the two hingedly connected wires while one is under pull from the other to effect a further relative shifting movement between them effective to decrease the distance in the direction of pull between their ends at one lateral edge of the belt and to increase the distance in the same direction between their ends at the opposite lateral edge of the belt, all without interrupting the pull on any of the turns of the trailing wire from its hingedly connected leading wire.

7. A woven wire conveyor belt as defined by claim 6 wherein the cooperatively shaped and associated turns of the two adjacent hingedly connected wires and the portions of the hinge wire extending through and hingedly connecting the turns thereof co-act to maintain substantially the same distance between the two hinged together wires intermediate the width of the belt when one is under pull from the other and there has been a relative shifting movement between them to vary in the direction of the pull the respective distances between their ends at the opposite lateral edges of the belt.

DONALD G. MERRILL.

References Cited in the file of this patent

UNITED STATES PATENTS

| Number | Name | Date |
|---|---|---|
| 2,234,537 | Blackburn | Mar. 11, 1941 |
| 2,255,364 | Pink | Sept. 9, 1941 |
| 2,278,361 | Rapisarda | Mar. 31, 1942 |
| 2,413,339 | Stadelman | Dec. 31, 1946 |

FOREIGN PATENTS

| Number | Country | Date |
|---|---|---|
| 1,835 | Great Britain | Jan. 27, 1893 |